United States Patent
Jensen et al.

(10) Patent No.: US 9,263,891 B2
(45) Date of Patent: Feb. 16, 2016

(54) POWER SAVING SYSTEM AND METHOD FOR A REFRIGERATION SYSTEM, PROVIDING FOR SHORT TERM RESPONSE TO REDUCE RIPPLES ON A POWER GRID

(75) Inventors: Helge Vandel Jensen, Augustenborg (DK); Claus Thybo, Soenderborg (DK); Leo Bram, Augustenborg (DK); Ejner Kobberoe, Nordborg (DK)

(73) Assignee: Danfoss A/S, Nordborg (DK)

( * ) Notice: Subject to any disclaimer, the term of this patent is extended or adjusted under 35 U.S.C. 154(b) by 1000 days.

(21) Appl. No.: 13/139,049

(22) PCT Filed: Dec. 14, 2009

(86) PCT No.: PCT/DK2009/000255
§ 371 (c)(1),
(2), (4) Date: Sep. 8, 2011

(87) PCT Pub. No.: WO2010/069316
PCT Pub. Date: Jun. 24, 2010

(65) Prior Publication Data
US 2011/0313588 A1    Dec. 22, 2011

(30) Foreign Application Priority Data

Dec. 15, 2008  (DK) .................................. 2008 01782

(51) Int. Cl.
| | | |
|---|---|---|
| H02J 3/24 | (2006.01) | |
| H02J 3/14 | (2006.01) | |
| F25D 29/00 | (2006.01) | |

(52) U.S. Cl.
CPC .............. *H02J 3/14* (2013.01); *F25B 2400/22* (2013.01); *F25D 29/00* (2013.01); *Y02B 30/765* (2013.01);

(Continued)

(58) Field of Classification Search
CPC ..... Y04S 20/222; Y04S 20/244; F25D 29/00; H02J 3/01; H02J 3/14; Y02B 70/3225; Y02B 30/765; Y02B 70/3275; G06Q 50/06; F24F 11/0012; F24F 11/0086; F25B 2400/22
USPC ......... 700/275, 276, 286, 291–296, 299, 300; 323/234, 299, 304
See application file for complete search history.

(56) References Cited

U.S. PATENT DOCUMENTS

| | | | | |
|---|---|---|---|---|
| 4,317,049 | A | * | 2/1982 | Schweppe ........................ 307/39 |
| 5,462,225 | A | * | 10/1995 | Massara et al. .................. 236/47 |

(Continued)

FOREIGN PATENT DOCUMENTS

| | | |
|---|---|---|
| DE | 197 50 053 A1 | 5/1999 |
| EP | 1 758 225 A2 | 2/2007 |

(Continued)

OTHER PUBLICATIONS

PCT Search Report for Serial No. PCT/DK2009/000255 dated Mar. 16, 2010.

*Primary Examiner* — M. N. Von Buhr
(74) *Attorney, Agent, or Firm* — McCormick, Paulding & Huber LLP

(57) ABSTRACT

The present invention relates to a method and a system to reduce losses of energy due to ripples, especially at the power grid, the ripples being short term power shortages or excess power. The method is based on the idea of shutting off energy consuming devices during a period of power shortage, if their operation is not necessary, and optionally to turn on such energy consuming devices during periods of excess power, if energy may be stored in them, especially when energy may be stored as some physical parameter or variable, being a part of the operation of the energy consuming devices, such as the temperature of a freezer.

18 Claims, 4 Drawing Sheets

(52) U.S. Cl.
CPC .......... *Y02B 70/3225* (2013.01); *Y02B 70/3275* (2013.01); *Y04S 20/222* (2013.01); *Y04S 20/244* (2013.01)

(56) References Cited

U.S. PATENT DOCUMENTS

| | | | | |
|---|---|---|---|---|
| 5,675,503 A | * | 10/1997 | Moe et al. | 700/296 |
| 5,729,421 A | * | 3/1998 | Gershen et al. | 361/113 |
| 7,010,363 B2 | * | 3/2006 | Donnelly et al. | 700/19 |
| 7,123,994 B2 | | 10/2006 | Weik et al. | |
| 7,356,385 B2 | * | 4/2008 | Lenarduzzi et al. | 700/295 |
| 7,356,422 B2 | * | 4/2008 | Schweitzer, III | 702/60 |
| 7,469,190 B2 | * | 12/2008 | Bickel | 702/60 |
| 7,729,811 B1 | * | 6/2010 | Weir et al. | 700/295 |
| 8,010,240 B2 | * | 8/2011 | Mattiocco et al. | 700/296 |
| 8,201,000 B2 | * | 6/2012 | Boss et al. | 713/320 |
| 8,205,106 B2 | * | 6/2012 | Boss et al. | 713/320 |
| 8,315,717 B2 | * | 11/2012 | Forbes et al. | 700/22 |
| 8,396,607 B2 | * | 3/2013 | Hirst | 700/295 |
| 8,445,150 B2 | * | 5/2013 | Ballantine | 429/428 |
| 8,554,387 B2 | * | 10/2013 | Boss et al. | 700/293 |
| 8,793,021 B2 | * | 7/2014 | Watson et al. | 700/276 |
| 8,798,801 B2 | * | 8/2014 | Subbloie | 700/291 |
| 8,805,597 B2 | * | 8/2014 | Steffes et al. | 700/295 |
| 2007/0198133 A1 | * | 8/2007 | Hirst | 700/295 |
| 2007/0220907 A1 | | 9/2007 | Ehlers | |
| 2008/0086239 A1 | * | 4/2008 | Zhang et al. | 700/295 |
| 2008/0272934 A1 | * | 11/2008 | Wang et al. | 340/870.11 |
| 2010/0091423 A1 | * | 4/2010 | Johnson | 361/118 |

FOREIGN PATENT DOCUMENTS

| | | | | |
|---|---|---|---|---|
| GB | 2361118 A | * | 10/2001 | H02J 3/14 |
| JP | 2002235977 A | | 8/2002 | |
| JP | 2007060848 A | | 3/2007 | |
| JP | 2008-543256 A | | 11/2008 | |
| RU | 2338310 C1 | | 11/2008 | |
| WO | 9924771 | | 5/1999 | |
| WO | 2006/128709 A2 | | 12/2006 | |

* cited by examiner

POWER SAVING SYSTEM AND METHOD FOR A REFRIGERATION SYSTEM, PROVIDING FOR SHORT TERM RESPONSE TO REDUCE RIPPLES ON A POWER GRID

CROSS REFERENCE TO RELATED APPLICATIONS

This application is entitled to the benefit of and incorporates by reference essential subject matter disclosed in International Patent Application No. PCT/DK2009/000255 filed on Dec. 14, 2009 and Danish Patent Application No. PA 2008 01782 filed Dec. 15, 2008.

FIELD OF THE INVENTION

The present invention relates to a method and a system to reduce losses of energy due to ripples, especially at the power grid, the ripples being short term power shortages or excess power. The method is based on the idea of shutting off energy consuming devices during a period of power shortage, if their operation is not necessary, and optionally to turn on such energy consuming devices during periods of excess power, if energy may be stored in them, especially when energy may be stored as some physical parameter or variable, being a part of the operation of the energy consuming devices, such as the temperature of a freezer.

BACKGROUND OF THE INVENTION

Presently electricity produced by the power plant is not stored in the transmission system, but is rather generated at the same time as it is consumed. Consequently, it is necessary to uphold reserves at all times in order to respond instantly to unexpected changes in consumption. These are especially short term load variations, also referred to as ripples, being fluctuations in the order of minutes or even less than one minute. The reserves are activated within a few seconds in order to compensate for load variations. Other options to compensate for load variations are to adjust the energy production such as through fuel adjustment, throttling steam valve or condensate flow control. All of these lead to reduced efficiency of power generation, and it has been estimated that the annual global costs of operational losses in the power industry amounts to more than 14.000.000 €.

One document U.S. Pat. No. 7,123,994 describes a power consumption management method of managing energy consumed by a group of energy consuming devices. The energy consuming devices exchange messages according to an energy management control protocol via a communication media. The energy management control protocol comprises an energy booking message type for announcing future energy consumption, an energy reduction indication message type for announcing possible reduction of energy consumption and a granting message type for granting an energy booking message and/or an energy reduction indication. The energy consuming devices negotiate their energy consumption by means of the messages exchanged according to the energy management control protocol and control their energy consumption according to the result of this negotiation.

When receiving a request to decrease power consumption, the energy consuming devices determine possible reduction of energy consumption, assign priorities to these possibilities and announce these possibilities via an indication message to the other ones of the energy consuming devices.

Among the examples is the operation of a compressor or a refrigerator or freezer that might be interrupted for a specific time, if the cooling temperature of the refrigerator or freezer does not exceed a predefined critical temperature. If the cooling temperature exceeds such temperature, the control units assign a correspondingly high priority to the booking and indication messages.

Another example is a tumble-drier that may be interrupted within predefined time frames without any operational drawback.

A further example is a washing machine that can stop at stage of the washing program and may delay the start of the spin-dry-program.

Further, it is possible that different device priorities are assigned in the scheduling rules to different energy consuming devices. Such device priorities reflect the priorities chosen by the customer for its different energy consuming devices.

The system thus includes knowledge of the coming energy consumption of the devices of the group by the use of a protocol, and does not relate to short term non-predictable ripples.

Another document, WO06128709 does relate to a grid responsive control device, describing a load control device which is responsive to a physical variable representing the balance between load and generation on an electricity grid. The control device varies the energy consumption of the load based on the current value of the physical variable of the grid relative to a central value of that physical variable, which is derived from past readings of the physical variable of the grid. The grid responsive control device also takes into account the time since the load last varied its energy consumption in determining whether or not the grid variable load control should be provided.

Further, the document mentions that the primary function of the load is to maintain the physical variable within specified control limits. The loads will generally operate on a duty cycle, usually with a period in which the load is on and with a period in which the load is off.

The document, however, describes a method relating to a history of measurements of the individual devices, and is therefore not very suitable for short term responses to ripples on the power grid.

SUMMARY OF THE INVENTION

It is an object of this invention to introduce a method and system to smooth out such ripples on the public power grid, thereby saving energy and money.

The main idea of the method and system for smoothing ripples is to utilize the fact that many energy consuming devices, such as those described in for example U.S. Pat. No. 7,123,994 and WO06128709, are usually not turned on continuously. Indeed, many systems operate on a duty cycle by repeatedly turning on and shutting off. For example, refrigerators and freezers stop freezing when their inside temperature decreases to some lower limit, and then start freezing again when the their inside temperature increases to some upper limit. Such systems use energy to obtain a state of a physical parameter, such as temperature, and then let the system 'drift off' until new energy needs to be transferred to the system. One may speak of storing energy into a physical parameter (a variable physical parameter) of the device's operation. The physical parameter could be anything, such as a thermal energy, a kinetic energy (like the rotation of a motor shaft) or alternatively conditions like the ambient environmental state controlled by an air conditioner, air humidity, but they could, for the present invention, also relate to operations such as the running of a thumbler-drier or washing machine, where continuous operation is not critical.

The objective is obtained by introducing a method of managing, regulating or controlling energy consumed by a group of energy consuming devices, where the energy consuming devices may increase or decrease a physical parameter The method comprises the steps of receiving a message from a controller, either to decrease the energy consumption or to increase the energy consumption, wherein, each energy consuming device being in the process of increasing its physical parameter is instructed to stop increasing its physical parameter when the message is to decrease the energy consumption, and each energy consuming device being in the process of decreasing its physical parameter is instructed to start increasing its physical parameter when the message is to increase the energy consumption.

In one preferred embodiment of the invention, the energy consuming device is set to operate within a range of the physical parameter defined by a minimum physical parameter and a maximum physical parameter.

In this embodiment each energy consuming device preferably overrules the message and changes stage when reaching the minimum or maximum physical parameter, so that the energy consuming device changes to decrease the physical parameter when it reaches the maximum physical parameter and changes to increase the physical parameter when it reaches the minimum physical parameter.

The physical parameter of the invention may be a temperature, air humidity, $CO_2$ concentrations and any other ambient value relevant to the system.

In one preferred embodiment, the energy consuming device is either refrigeration, freezing devices, HVAC systems etc.

In one preferred embodiment, the message is related to ripples on the power grid in such a manner, that the message is to decrease energy consumption when the total energy delivered by the power grid increases above an expected delivered energy span, and to increase energy consumption when the total energy delivered by the power grid decreases below an expected delivered energy span.

According to one aspect of the invention, the ripples mean any fluctuations in the energy delivered by the power grid from the expected delivered energy span having time spans less that 30 minutes, or more preferable less than 10 minutes, or more preferable less than 1 minute.

One non-limiting example, where the method and system could advantageously be introduced is commercial refrigeration or freezing systems, for example to be found in supermarkets.

Each refrigeration entity comprises one or more evaporators, each being adapted to be in an active state in which a flow of refrigerant is allowed to pass along an evaporating surface, and in an inactive state in which such a flow is prevented. The evaporators can be switched between the active and the inactive states in order to obtain and maintain a temperature within a desired temperature range inside a refrigeration compartment of the refrigeration entity. Refrigeration systems of this kind often comprise a variable capacity compressor device, e.g. in the form of a compressor rack of two or more compressors. Thereby it is possible to adjust the refrigeration capacity of the refrigeration system (i.e. the amount of liquid refrigerant removed by the compressors from the evaporators of the refrigeration entities) to meet a refrigeration demand (i.e. the amount of gaseous refrigerant produced by the evaporators). In case the variable compressor device is in the form of a compressor rack, the refrigeration capacity is typically adjusted by switching compressors of the compressor rack on or off. If this is done relatively frequently, it results in significant wear on the compressors. The refrigeration demand of each refrigeration entity depends on the applied control strategy and on the external load on the refrigeration entity in question. In the present context the term 'load' should be interpreted to mean the heat applied to the refrigeration entity. Thus, changes in the load are normally caused by exterior effects, such as positioning new (most likely warmer) products in a refrigeration compartment of a refrigeration entity, or applying a night cover to one or more refrigeration entities.

In the present context the term 'refrigeration entity' should be interpreted to mean a location where refrigeration of products takes place. Thus, a refrigeration entity may be a display case, e.g. the kind which is normally used in a supermarket. The display cases may be open display cases or the kind having a door which the customer needs to open in order to gain access to the products being refrigerated. Alternatively, a refrigeration entity may be a larger entity, such as a closed refrigeration room, e.g. the kind which may be used in restaurants or a slaughterhouse. The refrigeration system may comprise refrigeration entities of various kinds, e.g. two or more of the kinds described above. Alternatively, the refrigeration system may comprise only one kind of refrigeration entities.

The flow of refrigerant passing each of the evaporators of the refrigeration entities is preferably controlled by means of one or more valves. The flow of refrigerant passing a specific evaporator may, thus, be controlled by means of one electronic valve being capable of controlling the flow of refrigerant in such a way that the temperature of the refrigeration entity in question is maintained within a desired temperature range, and in such a way that the suction pressure is maintained within a desired pressure range. Alternatively, the flow of refrigerant passing a specific evaporator may be controlled by means of two or more valves, e.g. a thermostatic expansion valve being capable of controlling filling, and an electronic valve (positioned in series with the thermostatic expansion valve) being capable of opening and closing the flow of refrigerant in such a way that the temperature is maintained within a desired temperature range.

In the present context the term 'suction pressure' is to be interpreted to mean a pressure of the refrigerant immediately upstream in relation to the compressor rack. The suction pressure is preferably measured by means of a probe positioned in an appropriate location. This pressure is determined by the amount of refrigerant being compressed by the compressors of the compressor rack and by the amount of refrigerant passing the evaporators of the refrigeration entities. Thus, the suction pressure is determined, on the one hand, by the consumption of refrigerant by the compressors, and, on the other hand, by the production of refrigerant by the refrigeration entities, as seen from the position of the probe.

When there is a need to apply fast balancing reserves, early cut-in/out of refrigeration thermostats can be used. This will give the power plants sufficient time to adjust their power generation to balance with the demand.

Other examples include HVAC systems, washing machines, tumble-driers, cooking machines (like ovens), and any other device that is operated within a defined span of one or more parameters, or that may be shut off for a short time.

In the example of an HVAC system the physical parameter or variable could be for example the ambient $CO_2$ or air humidity being measured by a sensor of the HVAC system, the HVAC system operating also to keep these within a span between a minimum and a maximum limit. As long as the physical parameter is within the span, the HVAC system may safely be turned off or on, depending on the situation.

One important aspect of one embodiment of the present invention, is to introduce a controller being at least logically positioned somewhere between the power supply and the energy consuming devices. This is a central control in general being totally independent of the individual energy consuming devices; its main task is to give a signal of power shortage or excess power. The system of the invention thus is independent of any local coordination of devices, such as by a protocol, nor does it need any feedback or response from the devices, though, in a more advanced version of the present invention, the controller would also receive response from the devices, like a feedback of their response, a indication of their present state etc. The energy consuming devices thus would typically be positioned at very different and totally unrelated places, such as supermarkets etc.

Further, the present invention operates with short and unexpected ripples on the power grid, or in the power supply, meaning that there would be no warning time. To do so, the devices just react to the signal from the controller if they are in the 'correct' state.

DETAILED DESCRIPTION OF THE PREFERRED EMBODIMENTS

Figure 1:
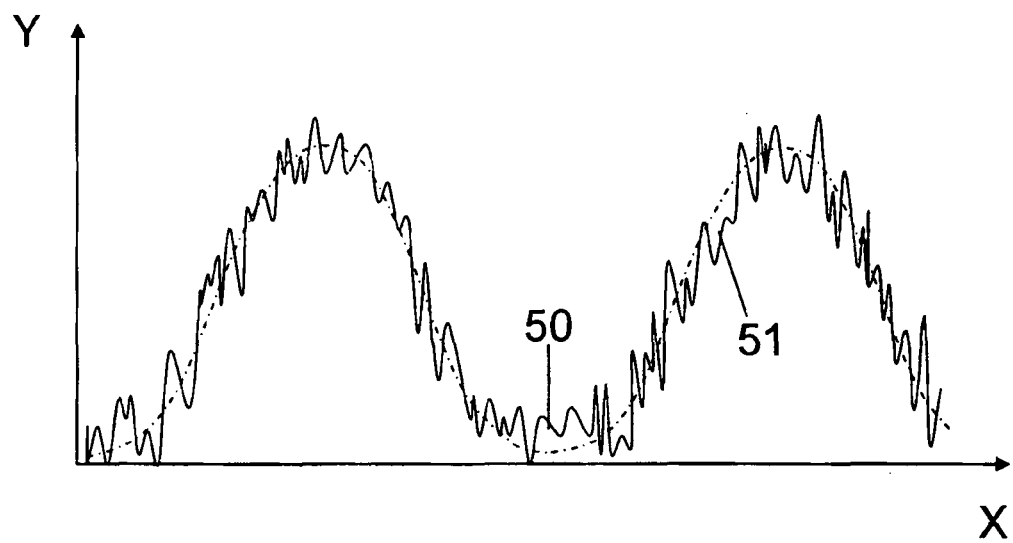
FIG. 1: is a schematic view of the power delivered through the public power grid.

FIG. 1 illustrates energy consumption during a two day period, where the X-axis is time and the Y-axis is consumed energy or power, where peaks occur during the day time. Some expected or basic energy consumption curve (the broken line) gives an expected energy, or power, to be delivered by the power plant, where this could be based on anything, such as an averaged value based on historical data, on the weather conditions, the season of year and any other factors.

The second curve, the solid line, illustrates the actual energy delivered by the power plants, showing fluctuations, or ripples, being deviations from the broken line. The ripples in the illustration are highly exaggerated. Such ripples are unpredictable and occur at time scales from an hour down to less than a minute.

The deviations of the ripples from the expected or basic energy consumption lead to periods of power shortage (50), and to periods of excess power (51).

Figure 2:
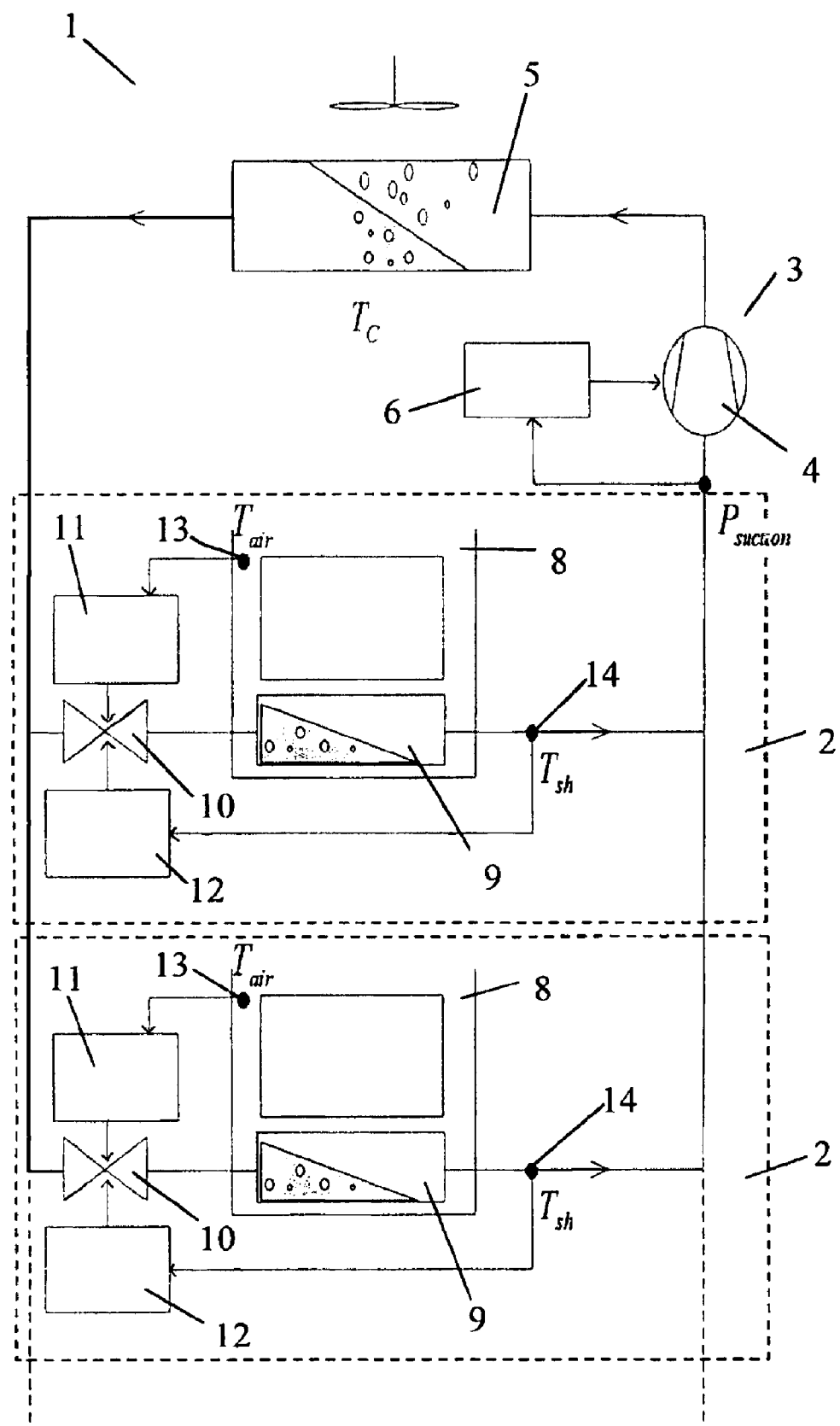
FIG. 2: is a schematic view of a refrigeration system.

FIG. 2 is a schematic drawing of a refrigeration system (1) comprising a number of refrigeration entities (2), a compressor (4), or a compressor rack (3) comprising any number of compressors (4), and condenser (s) (5). In the Figure, two refrigeration entities (2) are shown, but one or more additional refrigeration entities (2) may be added as illustrated by the broken line. The refrigeration entities (2) are coupled in parallel to each other, and each refrigeration entity (2) is coupled in series to compressor(s) (4) and condenser(s) (5).

The refrigeration system (1) illustrated in FIG. 2 is of the kind which is typically used in supermarkets.

The compressor(s) (4) may be controlled by a compressor control unit (6) on the basis of a measured suction pressure, Psuction. The condenser(s) (5) may be controlled by a condenser control unit (not shown) on the basis of a measured condenser pressure.

Each refrigeration entity (2) may comprise a display case (8) containing products which need to be refrigerated, e.g. food stuff, an evaporator (9), and a control valve (10). The control valve (10) serves as on/off valve and as superheat (expansion) valve, and may be a solenoid valve. When the control valve (10) is a solenoid valve, the superheat is typically controlled by a pulse-width modulation approach. The control valve (10) is controlled by means of a hysteresis controller (11) ensuring that the temperature of air present in the display case (8) is controlled to be within a desired temperature band, and by means of a superheat controller (12) ensuring that an optimum filling is maintained in the evaporator (9).

The hysteresis controller (11) receives an input from a temperature probe (13) positioned inside the corresponding display case (8), the input indicating the temperature, Tair, of the air present in the display case (8). If Tair reaches an upper limit (cut-in temperature) of the desired temperature band, the hysteresis controller (11) will cause the control valve (10) to open, thereby allowing a flow of refrigerant to pass across the evaporator (9). Thus, the evaporator (9) is switched to an active state, and refrigeration is provided for the contents of the display case (8). Similarly, if Tair reaches a lower limit (cut-out temperature) of the desired temperature interval, the hysteresis controller (11) will cause the control valve (10) to close, thereby preventing a flow of refrigerant from passing across the evaporator (9). Thus, the evaporator (9) is switched to an inactive state, and refrigeration is no longer provided for the contents of the display case (8).

The superheat controller (12) receives an input from a superheat sensor (14) which measures the difference between the evaporating temperature and the temperature in the outlet of the corresponding evaporator (9). This is typically done by measuring the suction pressure, converting that to an evaporating temperature and subtracting this from a measured outlet temperature. It can alternatively be achieved by measuring the temperature in the inlet and outlet of the evaporator (9) and producing the difference. The superheat controller (12) controls the filling of refrigerant to the evaporator 9 in such a way that the liquid filled part of the evaporator (9) is maximised, while not allowing liquid refrigerant to exit the evaporator (9). The superheat controller (12) achieves that by adjusting the control valve (10) to obtain a small, but positive, superheat. By doing that it utilizes that the temperature profile in the evaporator (9) is substantially constant in the liquid filled region and is increasing in the dry region. Hence, a positive superheat temperature ensures that no liquid refrigerant exits the evaporator (9). By keeping the superheat temperature low, the liquid region is maximised.

Figure 3:
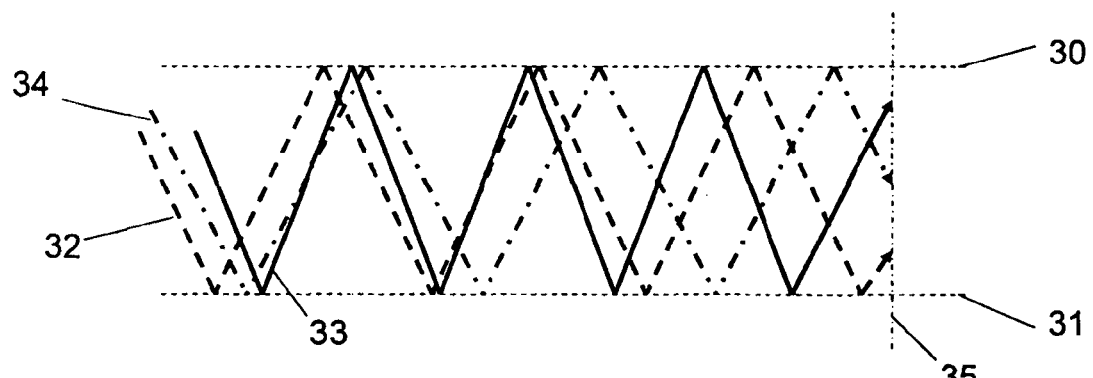
FIG. 3: is a schematic view of the cycles of a variable physical parameter of three devices.

FIG. 3 shows graphs which illustrate typical variations in temperature, Tdisplay, in a controlled refrigeration system. The Figure illustrates variations in the temperature, Tdisplay, of three different refrigeration entities, where each refrigeration entity is represented by a curve (32), (33) and (34). As can be seen, Tdisplay for each refrigeration entity is allowed to vary within a temperature range defined by an upper value (30) and a lower value (31). When Tdisplay for a refrigeration entity reaches the upper limit value (30) of the temperature range, the solenoid valve (10) corresponding to that refrigeration entity will open, thereby allowing a flow of refrigerant to pass the evaporator of the refrigeration entity. See FIG. 2 for details. The refrigeration entity will accordingly start refrigerating, thereby causing Tdisplay to decrease. Similarly, when Tdisplay for a refrigeration entity reaches the lower limit (31) of the temperature interval, the corresponding solenoid valve (10) will close, thereby preventing a flow of refrigerant from passing the corresponding evaporator. Similarly to what is described above, this will cause Tdisplay to increase for the corresponding refrigeration entity.

The illustrated example operates with the same upper (30) and lower (31) limit values, however, each consuming device (22) will usually have individual upper (30) and lower (31) limit values of their variable physical parameters (32, 33, 34), the physical parameters (32, 33, 34) may even be different physical parameters, for example one being a temperature, one being a rotation of a motor shaft and one being an ambient condition like the air humidity. The physical parameter may be any operational state of energy consuming devices (22) where continuous energy consumption is not required.

Again it shall be noted, that even though the example illustrates three energy consuming devices (22) with three physical parameters (32, 33, 34), any number of energy consuming devices and any number of physical parameters apply to the invention.

Figure 4:
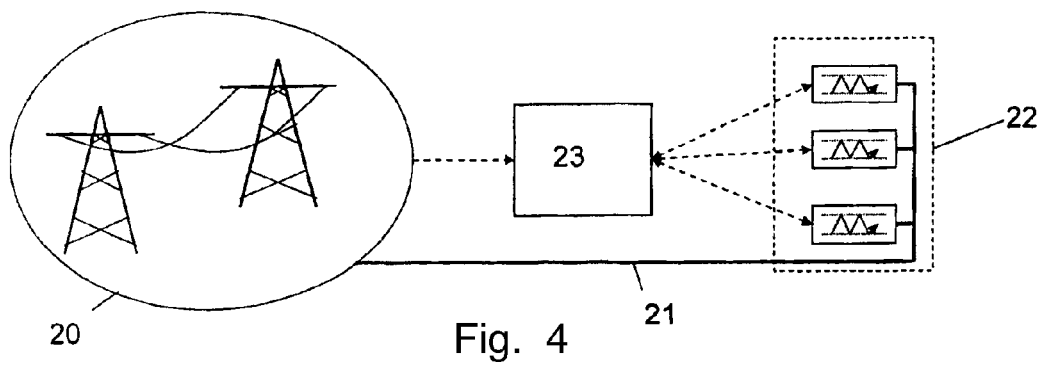
FIG. 4: is a schematic view of the set up of the invention.

FIG. 4 illustrates a set up of the present invention, where a power supply (20), such as Power Plant, through a power grid (21) delivers energy to a group of energy consuming devices (22), where some of or all the energy consuming devices (22) optionally could be refrigeration entities (2) as described above and shown in FIG. 2. However, any energy consuming device would also apply to the present invention such as HVAC systems, compressor systems in general, systems utilizing an electric motor, etc.

A controller (23) is in data communication either directly with each of the energy consuming devices (22), or indirectly via a local controller monitoring, regulating and/or controlling the energy consuming devices (22). The controller (23) is able to give messages individually, either directly or indirectly and by any means known in the art to send and receive either digital or analogue messages, to each of the energy consuming devices (22), such as to shut off or to turn on and start the device (22), for example to close or open the solenoid valve (10) in the example above.

The controller (23) is further in communication with the power supply (20) being informed of a starting power shortage (50) or a starting excess power (51).

Figure 5:
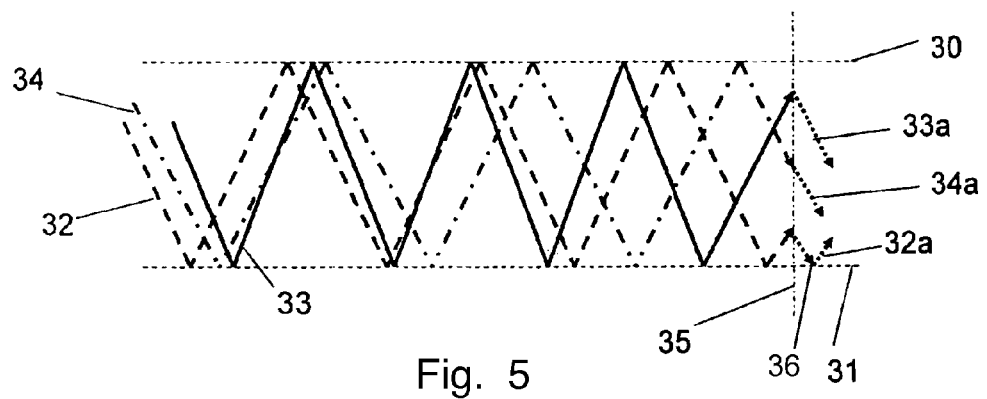
FIG. 5: is a schematic view of the cycles of a variable physical parameter of three devices when regulated according to a first aspect of the present invention.
Figure 6:
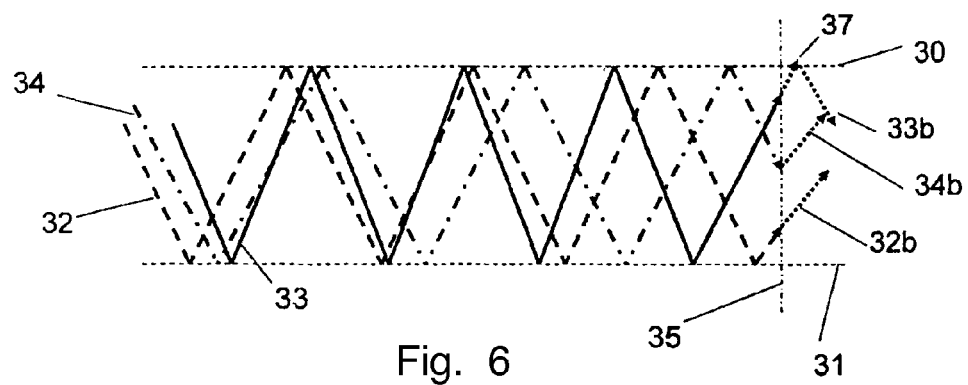
FIG. 6: is a schematic view of the cycles of a variable physical parameter of three devices when regulated according to a second aspect of the present invention.

FIGS. 5 and 6 illustrate a situation where a ripple starts with either a starting power shortage (50) or a starting excess power (51) condition. For those of the energy consuming devices (22), whose variable physical parameter increases when the energy consuming devices (22) are turned on and operate, FIG. 5 shows the situation of a starting power shortage (50), the message at the time (35) being to shut off those of the energy devices (22) presently consuming energy, and where the variable physical parameter (in the Figure the three curves (32, 33, 34) representing three energy consuming devices (22)) is below the upper limit value (30), this being the devices (22) corresponding to the curves (32) and (33), these curves changing direction (32a, 33a) to decreasing values, the curve (34) continuing unchanged (34a). At some time the curves (32a, 33a, 34a) may reach the lower limit value (31) as the curve (32a) does at a point (36). The devices (22) will then overrule the message and return to normal operational procedures changing the state of operation to increase the physical value, in the Figure being (32a).

FIG. 6 illustrates the same devices (22) where the message at the time (35) is to turn on those energy consuming devices (22) being turned off when a state of excess power (51) starts. The devices (22) represented by the curves (32, 33) then continue unchanged (32b, 33b), but the curve (34) changes state to an increasing physical value (34b) when the device (22) is turned on. Again, when reaching the upper limit value (30) the message is overruled and the devices (22), in the illustration the device (22) corresponding to the curve (33), are returning to normal operational procedures changing the state of operation to decrease the physical value (33b).

For those energy consuming devices (22) where the variable physical parameter decreases when the energy consuming devices (22) are turned on and operate, the FIGS. 5 and 6 illustrate the opposite situation. When a ripple starts with a starting state of excess power (51) the energy consuming devices (22) are turned on and operate, the message at the time (35) being to turn on those of the energy devices (22) presently shut off as illustrated in FIG. 6, and where the variable physical parameter (in the figure the three curves (32, 33, 34) representing three energy consuming devices (22)) are below the upper limit value (30), this being the devices (22) corresponding to the curves (32) and (33), these curves changing direction (32a, 33a) to decreasing values, the curve (34) continuing unchanged (34a). At some time the curves (32a, 33a, 34a) may reach the lower limit value (31) as the curve (32a) does at a point (36). The devices (22) will then overrule the message and return to normal operational procedures changing the state of operation to increase the physical value, this in the figure being (32a).

FIG. 6 then illustrates the same devices (22) where the message at the time (35) is to shut off those energy consuming devices (22) being turned on when a state of power shortage (50) starts. The devices (22) represented by the curves (32, 33) then continue unchanged (32b, 33b), but the curve (34) changes state to an increasing physical value (34b) when the device (22) is shut off. Again, when reaching the upper limit value (30) the message is overruled and the devices (22), at the illustration the device (22) corresponding to the curve (33), are returning to normal operational procedures changing the state of operation to decrease the physical value (33b) as the device (22) corresponding to the curve (33) does at point (37).

It shall be noted, that after a message has induced operational changes of energy consuming devices (22), then they enter into a normal state of operation, meaning they will thereafter respond to any conditions and settings as in normal state of operation.

In a more advanced embodiment of the invention, more than one parameter, such as temperature, is a variable parameter being used to decide whether the individual energy consuming devices (22) are to act to the message.

Figure 7:
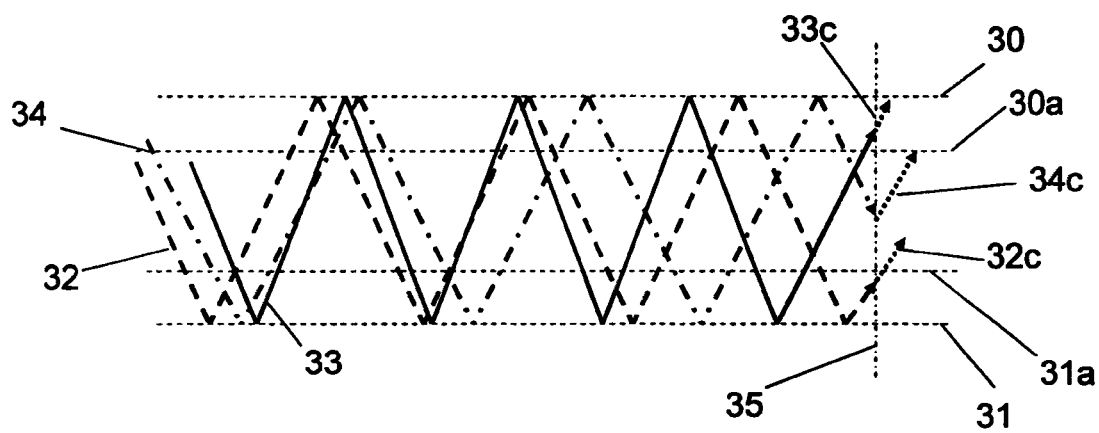
FIG. 7: is a schematic view of the cycles of a variable physical parameter of three devices when regulated according to a third aspect of the present invention.

In another advanced embodiment of the invention, the system operates with at least two upper limit values (30), and at least two lower limit values (31), for each of the energy consuming devices (22). One being the upper (30) and lower (31) limit values to which the devices (22) are to react in a normal operational procedure without any messages interfering with the operational states, another upper (30a) and lower (31a) limit value (see FIG. 7) defining a span of the physical parameters (32, 33, 34) wherein the messages are valid, meaning, if the physical parameter (like (32) and (33) in FIG. 7) are outside this limit defined by an upper message limit value (30a) and a lower message limit value (31a), then the message is not considered valid for those devices (22), meaning that the curves (32c) and (33c) being outside the span given by the upper message limit value (30a) and the lower message limit value (31a), continue their operational state as if no message was given, but the curve (34) being within the span changes its operational state to increase the physical parameter (34c).

While the present invention has been illustrated and described with respect to a particular embodiment thereof, it should be appreciated by those of ordinary skill in the art that various modifications to this invention may be made without departing from the spirit and scope of the present.

What is claimed is:

1. A method of managing, regulating and/or controlling energy consumed by a refrigeration system comprising at least one compressor feeding a plurality of refrigeration entities to provide short term responses to ripples on a power grid, where the refrigeration entities of the plurality of refrigeration entities may each increase or decrease a physical parameter, and where the refrigeration entities of the plurality of refrigeration entities are each set to operate within a range of the physical parameter defined by a minimum physical parameter and a maximum physical parameter, the method comprising the steps of receiving a message from a controller either to decrease or to increase the energy consumption so as to provide a short term response to reduce ripples on the power grid, and where the decrease or increase in the energy consumption is achieved by changing the physical parameter such that each refrigeration entity of the plurality of refrigeration entities being in the process of decreasing its physical parameter is instructed to stop decreasing its physical parameter when the message is to decrease the energy consumption, and each refrigeration entity of the plurality of refrigeration entities being in the process of increasing its physical parameter is instructed to start decreasing its physical parameter when the message is to increase the energy consumption, while the at least one compressor ensures circulation of refrigerant to the extent needed by the refrigeration system.

2. The method according to claim 1, wherein each energy consuming device overrules the message and changes stage when reaching the minimum or maximum physical parameter, so that the energy consuming device changes to decrease the physical parameter when it reaches the maximum physical parameter and changes to increase the physical parameter when it reaches the minimum physical parameter.

3. The method according to claim 2, wherein the physical parameter is a temperature.

4. The method according to claim 3, wherein the energy consuming devices are either refrigeration or freezing devices.

5. The method according to claim 1, wherein the message to decrease energy consumption is provided by the controller when the total energy delivered by the power grid increases above an expected delivered energy span, and the message to increase energy consumption is provided by the controller when the total energy delivered by the power grid decreases below an expected delivered energy span.

6. The method according to claim 5, wherein the ripples are any fluctuations in the energy delivered by the power grid from the expected delivered energy span having time spans less than 30 minutes.

7. The method according to claim 5, wherein the expected delivered energy span is dynamic in time, meaning that it varies over at least one day and night and optionally also over a month and/or a year.

8. The method according to claim 7, wherein the expected delivered energy span being dynamic in time depends on one of or a combination of empiric data of the energy delivered by the power grid seen over the day, month and/or year, an adaptive model predicting the energy delivered by the power grid, and/or the external weather conditions such as temperature, sunshine, cloudiness, barometric state and humidity.

9. The system operating by the method according to claim 1.

10. The method according to claim 5, wherein the ripples are any fluctuations in the energy delivered by the power grid from the expected delivered energy span having time spans less than 15 minutes.

11. The method according to claim 5, wherein the ripples are any fluctuations in the energy delivered by the power grid from the expected delivered energy span having time spans less than 20 minutes.

12. A method of managing, regulating and/or controlling energy consumed by a refrigeration system comprising at least one compressor, a condenser and at least two refrigeration entities in parallel to each other, each refrigeration entity adapted to increase or decrease a physical parameter within a controlled environment, the method comprising:
receiving a message from a controller either to decrease or increase energy consumption so as to provide a short term response to reduce ripples on a power grid;
instructing, by the controller, each refrigeration entity that is in the process of decreasing its physical parameter to stop decreasing its physical parameter when the message is to decrease the energy consumption, while ensuring circulation of refrigerant by the at least one compressor to the extent needed by the refrigeration system; and
instructing, by the controller, each refrigeration entity that is in the process of increasing its physical parameter to start decreasing its physical parameter when the message is to increase the energy consumption, while ensuring circulation of refrigerant by the at least one compressor to the extent needed by the refrigeration system.

13. The method of claim 12, wherein the physical parameter may be a temperature, air humidity, $CO_2$ concentrations or any other ambient value relevant to the system.

14. The method of claim 12, wherein each refrigeration entity comprises:
a refrigeration entity controller;
a physical parameter probe positioned inside the controlled environment; and
a control valve controlling flow of refrigerant from the at least one compressor to an evaporator for the controlled environment;
wherein the refrigeration entity controller receives an input from the physical parameter probe indicating the physical parameter inside the controlled environment; and
wherein if the physical parameter reaches an upper limit of a range defined by a minimum physical parameter and a maximum physical parameter, the refrigeration entity controller opens the control valve of the associated refrigeration entity;
wherein if the physical parameter reaches a lower limit of the of a range defined by a minimum physical parameter and a maximum physical parameter, the refrigeration entity controller closes the control valve of the associated refrigeration entity.

15. The method of claim 14, wherein the control valve is a solenoid valve.

16. The method according to claim 12, wherein the at least one compressor continues to circulate refrigerant when the controller instructs the refrigeration entities to decrease or increase their physical parameters.

17. The method according to claim 12, wherein the message to decrease energy consumption is provided by the controller when the total energy delivered by the power grid increases above an expected delivered energy span, and the message to increase energy consumption is provided by the controller when the total energy delivered by the power grid decreases below an expected delivered energy span.

18. The method according to claim 12, wherein the at least one compressor is a variable capacity compressor device.

* * * * *